United States Patent [19]

Ginkel et al.

[11] Patent Number: 4,857,372
[45] Date of Patent: Aug. 15, 1989

[54] GRAPHIC COMPOSITE WITH THERMALLY DETACKIFIABLE ADHESIVE PREMASK TAPE

[75] Inventors: Scott T. Ginkel; Dennis O. Falaas, both of Stillwater, Minn.

[73] Assignee: Minnesota Mining and Manufacturing Company, St. Paul, Minn.

[21] Appl. No.: 905,871

[22] Filed: Sep. 10, 1986

[51] Int. Cl.⁴ .................................................. C09J 7/02
[52] U.S. Cl. ...................................... 428/42; 428/200; 428/346; 428/352; 524/254
[58] Field of Search ................ 524/254; 428/343, 346, 428/352, 41, 42, 200

[56] References Cited

U.S. PATENT DOCUMENTS

| | | | |
|---|---|---|---|
| 4,077,926 | 3/1978 | Sanderson et al. | 428/355 X |
| 4,286,047 | 8/1981 | Bennett et al. | 430/280 |
| 4,315,790 | 2/1982 | Rattee et al. | 428/200 X |
| 4,364,972 | 12/1982 | Moon | 428/355 X |
| 4,404,246 | 9/1983 | Charbonneau et al. | 428/212 |
| 4,623,569 | 11/1986 | Relson | 428/200 X |

Primary Examiner—Marion C. McCamish
Assistant Examiner—M. A. Katz
Attorney, Agent, or Firm—Donald M. Sell; Walter N. Kirn; Gerald F. Chernivec

[57] ABSTRACT

A graphic composite having a heat detackifiable adhesive, the composite comprising a carrier film; a graphic design adhered to the top surface of the carrier film; a protective coating lying over the graphic design; a heat detackifiable premask adhesive layer overlying the protective coating; and a premask carrier web adhered to the premask adhesive layer.

6 Claims, 1 Drawing Sheet

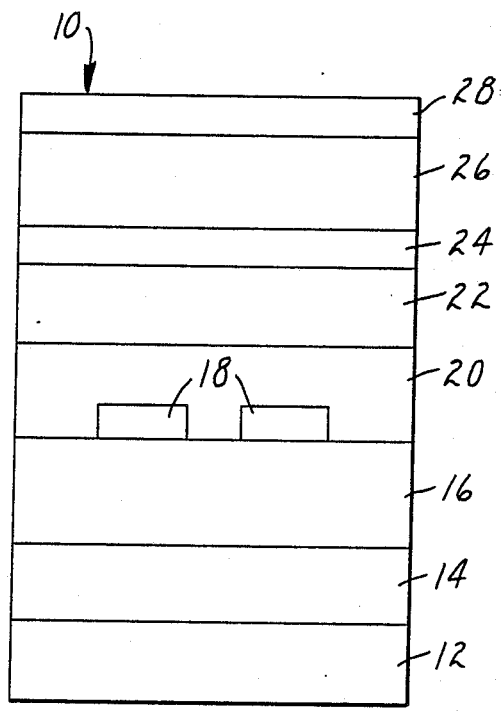

GRAPHIC COMPOSITE WITH THERMALLY DETACKIFIABLE ADHESIVE PREMASK TAPE

TECHNICAL FIELD

This invention relates to graphic composites, particularly to a heat detackified adhesive premask tape for use in conjunction with a graphic composite.

BACKGROUND

There are many situations in which it is desirable to apply a graphic to a surface and subsequently apply paint. In order for the graphic to be visible after paint is applied a removable protective layer must be applied to the outward facing surface of the graphic. This removable protective layer or premask, as it is known in the art, is removed from the graphic after the paint is applied to expose the graphic.

It is desirable to apply the graphic before the substrate is painted because, after painting and premask removal, the edges of the graphic are embedded under the paint. The graphic is thus much more difficult to remove or damage and is also more aesthetically pleasing. A premask graphic inserted under the paint is also useful to hide a paint break line. If a conventional graphic, for example a stripe, is applied over a paint break line, the break telegraphs through the stripe and is aesthetically displeasing.

A prevalent application for this type of graphic is in the automotive industry. Graphics of various configurations, including pin-stripes, designs, logos, trademarks, fine dot patterns, etc., are applied to automobile bodies. These graphics are typically applied to the automobile prior to the application of the final paint coat for the above reasons. The top coat of an automobile is typically baked at between 120° C. to 150° C. to harden the paint.

A significant problem with conventional premask tapes is that adhesion of the premask adhesive increases during this baking cycle, resulting in difficult removal of the premask from the graphic. If adhesion between the premask and the graphic exceeds the adhesion between the graphic and the automobile, the graphic will be removed or damaged in the process of removing the premask. This, of course, is clearly an undesirable result.

It is therefore desirable to provide a premask adhesive tape which adheres to the graphic during application to a surface, but which is detackified when subjected to the high temperatures of the paint bake cycle.

DISCLOSURE OF THE INVENTION

The present invention provides a graphic composite having a heat detackifiable premask adhesive, the composite comprising
(a) a carrier film;
(b) a graphic design adhered to the top surface of the carrier film;
(c) a protective coating over the graphic design;
(d) a heat detackifiable premask adhesive layer overlying the protective coating; and
(e) a premask carrier web adhered to the premask adhesive layer.

The laminated graphic composite may also contain a pressure sensitive adhesive coated on the bottom of the carrier film for adhering the graphic composite to a substrate such as an automobile. The pressure sensitive adhesive is typically covered with a removable release liner before use. Also, a backsize coating may be coated on the top surface of the premask web to facilitate the adhesion of paint thereto. The protective coating is typically clear but may contain dyes, metal flakes, or the like as desired.

In use, the graphic composite is typically adhered to a surface, such as an automobile body, prior to painting. Paint is then applied, covering the graphic composite and the adjacent surface. The surface, with graphic composite thereon, is then baked at, for example, between about 120° C. to 150° C. thereby hardening the paint and detackifying the premask adhesive. The premask carrier web and the premask adhesive may then be easily removed from the graphic with the graphic remaining adhered to the surface with its edges buried beneath the paint.

BRIEF DESCRIPTION OF THE DRAWING

The invention is further explained with reference to the drawing wherein:

FIG. 1 is a schematic cross-section of a laminated graphic composite of the present invention.

DETAILED DESCRIPTION

A laminated graphic composite 10, as shown in FIG. 1, includes release liner 12 which is removably adhered to a surface adhesive layer 14. Surface adhesive layer 14 is coated on the bottom of carrier film 16.

Release liner 12 may comprise any material which is readily removed from the adhesive 14. Release liner 12 typically comprises polyester, polypropylene, polyethylene or silicone coated paper. Adhesive 14 may comprise any suitable adhesive to bond the graphic composite to the substrate. Typical adhesives used to bond a graphic stripe to an auto body include isooctyl acrylate/ vinyl acetate/acrylic acid copolymer, methyl butyl acrylate/acrylic acid copolymer, and isooctyl acrylate/methyl acrylate/acrylic acid copolymer.

Carrier film 16 may be comprised of any suitable free forming film, for example, polyvinyl chloride, acrylic, polyvinylidene fluoride, polyurethane, polyvinyl fluoride acrylates, polyolefins, polyesters, polyepoxides, polyamides, polyimides, ionomers, alkyds, polyvinyl alcohol esters (polyvinyl acetate, polyvinyl butyrate), styrene polymers and rubbers. These materials may be used alone, blended and/or laminated together.

Graphic design 18 is provided on top of carrier film 16. Graphic 18 can be generated from any suitable type of printing ink. The ink vehicle may vary, comprising, for example, vinyl, acrylic, urethane, acrylates, cellulosic polymers or other film forming material. These materials can be used individually or blended together. Graphic 18 can be applied by screen printing, gravure printing, letter press, flexographically, ink jet or by any other means of generating a graphic.

Protective coating 20 lies over the graphic 18 and the carrier film 16. Protective coating 20 is typically clear, but may contain dyes, metal flakes or other additives as desired. Protective coating 20 may be comprised of any material suitable to protect the graphic in its intended use. Typical materials include: acrylics, vinyls, urethanes, epoxies, styrenic polymers, polyvinylidene fluorides, polyesters, ionomers, and acrylates, and blends thereof.

Coating 20 may be applied, for example, by screen printing, gravure printing, flexography, roll coating, spraying or other suitable means.

A layer of premask adhesive 22 lies on top of protective coating 20. Premask adhesive 22 comprises, for example, at least one melamine compound present in the range of 0.5 to 50 percent by weight, a diaziridine compound present in the range of 1 to 30 percent by weight, and a copolymer of (a) an acrylic acid ester of nontertiary alcohol, preferably having from 1-14 carbon atoms, and (b) at least one copolymerizable monoethylenic monomer, preferably selected from the group consisting of acrylic acid, methacrylic acid, and itaconic acid.

Primer layer 24 is provided between the premask adhesive 22 and a premask carrier web 26. Useful primer layers 24 include: polycarbodiimide, chlorinated polyolefins, sulfonated polyesters, acrylates, acrylic, solvent wipe, aminized polybutadiene or anything else which would promote cohesion between adhesive 22 and premask carrier web 26.

Premask carrier web 26 can be comprised of any free film forming material such as polyethylene terephalate, polypropylene, polyethylene or, in addition, paper.

While a premask adhesive comprising a melamine compound and a diaziridine compound is preferred, the present invention also contemplates the use of other suitable crosslinking agents to provide a heat detackifiable adhesives.

Premask adhesive 22 must provide an initial adhesion between premask carrier web 26 and primer layer 24 which is greater than the adhesion between release liner 12 and surface adhesive 14. Initial adhesion refers to the adhesion provided by premask adhesive 22 prior to being subjected to an elevated temperature, for example, that temperature provided by a paint bake cycle of an automobile body. After being subjected to an elevated temperature, the adhesion provided by premask adhesive 22 must be lower than the adhesion provided by surface adhesive 14 between carrier film 16 and the surface to which graphic composite 10 is adhered.

To accomplish these desired objectives, the diaziridine compound is believed to provide an initial crosslinking to maximize initial adhesion between premask carrier web 26 and primer layer 24. The melamine compound is believed to provide extensive crosslinking when premask adhesive 22 is subjected to elevated temperatures. The extensive crosslinking detackifies premask adhesive 22, thus sufficiently lowering adhesion. Thus, the scope of the present invention contemplates one skilled in the art providing alternative compounds to accomplish the functions provided by the melamine and diaziridine compounds.

A backsize film 28 is provided on top of premask acrylic web 26 to promote adhesion of the paint thereto. A typical backsize film 28 consists of a terephalate/isophalate polyester (Vitel 222 from Goodyear) a Cellulose Acetate Butyrate (1/20 sec CAB from Eastman Kodak) dissolved in toluene.

In use, release liner 12 is removed to expose surface adhesive layer 14. Graphic composite 10 is then adhered to a surface (not shown) by means of surface adhesive layer 14. A typical surface would be an automobile body, applied, for example, after the first body color.

After graphic composite 10 is adhered to the surface, paint is applied, covering graphic composite 10 and the adjacent surface. To harden the paint, the surface, for example an automobile body, is baked at, for example, between about 120° C. to 150° C. for approximately 20 minutes. In addition to hardening the paint, the heat detackifies premask adhesive 22. Premask carrier web 26 and adhesive 22 may then be easily removed. The paint adheres to backsize film 28 to prevent paint flakes from freely falling to the floor or contaminating other surfaces.

After web 26 is removed, the remaining portions of the graphic composite 10 remain securely adhered to the substrate with the edges of the composite protected by lying beneath the paint layer.

The invention is further described on the following non-limiting examples, wherein all parts are by weight unless otherwise indicated:

EXAMPLES 1-5

A detackified premask adhesive was prepared by first preparing a pre-adhesive A by mixing 90 parts isooctyl acrylate, 10 parts acrylic acid and 0.33 parts benzoyl peroxide (Lucidol 70, commercially available from Pennwalt). The mixture was agitated and heated at 60° C. for 8 hours in ethyl acetate in a nitrogen atmosphere. After the reaction was complete, toluene and isopropanol were added to reduce the polymer solids content to 18.5% (±1%). This mixture will hereinafter be referred to as pre-adhesive A. The pre-adhesive A had an inherent viscosity of 1.53 (+0.075) at 0.2 g/dl in ethyl acetate.

To the pre-adhesive A, 4 parts of a 5% 1,1-isophthaloly bis (2-methylaziridine) solution was added. To this, varying amounts of a methylated melamine resin, Resimene 731, commercially available from Monsanto, were added. The adhesive was cast onto a primed polyethylene terephalate premask carrier web and dried for 5 minutes at 60° C. at a dry coating weight of 3 grams/154.85 cm$^2$. The adhesive properties of examples 1 through 5 were measured before and after a 10 minute baking cycle at 150° C. The results were as follows:

|  | Resimene 731 Parts | Initial Unbaked Keil Values (g/in) | Baked Keil Values 10 Min. @ 150° C. (g/in) |
| --- | --- | --- | --- |
| Example 1 | 1.0 | 600 | 300 |
| Example 2 | 2.0 | 550 | 250 |
| Example 3 | 3.0 | 400 | 200 |
| Example 4 | 4.0 | 400 | 150 |
| Example 5 | 5.0 | 350 | 75 |

EXAMPLES 6-10

Examples 6 through 10 were prepared as described in examples 1-5 above, except that a methylated melamine, Resimene 745, commercially available from Monsanto was used in place of Resimene 731. The adhesion values were as follows:

|  | Resimene 745 Parts | Initial Unbaked Keil Values (g/in) | Baked Keil Values 10 Min. @ 150° C. (g/in) |
| --- | --- | --- | --- |
| Example 6 | 1.0 | 400 | 275 |
| Example 7 | 2.0 | 375 | 250 |
| Example 8 | 3.0 | 350 | 250 |
| Example 9 | 4.0 | 350 | 225 |
| Example 10 | 5.0 | 350 | 225 |

EXAMPLES 11-15

Examples 11 through 15 were prepared in a similar manner to Examples 1-5 above, except that a methylated/butylated melamine, Resimene 753, commercially available from Monsanto was used in place of Resimene 731. The adhesion results were as follows:

|  | Resimene 753 Parts | Initial Unbaked Keil Values (g/in) | Baked Keil Values 10 Min. @ 150° C. (g/in) |
| --- | --- | --- | --- |
| Example 11 | 1.0 | 350 | 250 |
| Example 12 | 2.0 | 350 | 200 |
| Example 13 | 3.0 | 400 | 200 |
| Example 14 | 4.0 | 350 | 200 |
| Example 15 | 5.0 | 375 | 200 |

EXAMPLES 16–20

Examples 16 through 20 were prepared in a similar manner as Examples 1–5 above, except that a methylated/butylated melamine, Resimene 755, commercially available from Monsanto was used in place of Resimene 731. The adhesion results were as follows:

|  | Resimene 755 Parts | Initial Unbaked Keil Values (g/in) | Baked Keil Values 10 Min. @ 150° C. (g/in) |
| --- | --- | --- | --- |
| Example 16 | 1.0 | 350 | 275 |
| Example 17 | 2.0 | 400 | 275 |
| Example 18 | 3.0 | 325 | 225 |
| Example 19 | 4.0 | 325 | 225 |
| Example 20 | 5.0 | 300 | 225 |

These adhesion values, before and after baking, show that the adhesion of the premask adhesive is substantially reduced after baking.

EXAMPLE 21

A graphic composite of the present invention was made as follows:

A release liner was made by coating a paper liner with a polyorgano siloxane release coating. The release coating was gravure printed at 450 feet per minute and cured at 350° F. for 4.11 seconds and at 120° C. for 4.11 seconds.

On the surface of the release liner a substrate adhesive was coated, comprising a copolymer of isooctyl acrylate/ vinyl acetate/acrylic acid (56/40/4 by weight) at 23% solids in ethyl acetate with an inherent viscosity of 1.2 g in 0.29/dl in ethyl acetate. The adhesive was knife coated using an orifice setting of 5.5 to 10 mls. The adhesive was dried at a web speed of 170 feet per minute at 45° C. for 35.3 seconds, 60° C. for 19.5 seconds and 105° C. for 19.5 seconds. The dried adhesive thickness was approximately 1 mil.

The carrier web and the substrate adhesive from the previous steps were laminated together on a standard laminator.

The carrier web was made of polyvinyl chloride film knife coated at a 4 mil orifice and fused at 175° C. for 48.45 seconds and at 230° C. for 32.30 seconds. The fused film thickness was approximately 2 mils.

The graphic design was then applied to the top of the carrier web by screen printing Scotchcal ® screen printing inks to the web. The graphics were then dried for 1 hour at 75° C.

A conventional acrylic clearcoat was then applied as the protective coating over the graphics. The clearcoat was then dried at 75° C. for one hour.

The premask carrier web was a polyethylene terephalate film. It was coated with a primer coat of 0.1% polycarbodiimide in toluene/isopropanol. The prime was applied to the carrier web by a gravure coater. The prime coat was dried at line speeds of 150 feet per minute at room temperature.

The top of the premask carrier web was coated with a backsize coating. The backsize consists of a terephalate/isophalate polyester (Vitel 222 from Goodyear) and Cellulose Acetate Butyrate (1/20 sec CAB from Eastman Kodak) dissolved in toluene. It was coated using a gravure coater with a 150 line knurled roll at speeds of 150 feet per minute and dried at room temperatures.

The premask adhesive was then coated on the prime coated side of the premask carrier web. The premask adhesive was made as follows:

|  | Weight % |
| --- | --- |
| Pre-Adhesive A | 94.0 |
| 5% 1,1-isophthaloly bis (2-methylaziridine) solution | 1.0 |
| Methylated/Butylated melamine-formaldehyde resin, Resimene 755 (Monsanto Company) | 5.0 |

This premask construction was laminated to the protective coating surface. This laminate will now be custom die cut into the finished parts.

What is claimed is:

1. A graphic composite comprising:
   (a) a carrier film having a bonding adhesive on the bottom surface thereof:
   (b) a graphic design adhered to the top surface of said carrier film;
   (c) a protective coating over said graphic design;
   (d) a heat detackifiable premask adhesive layer on said protective coating; and
   (e) a premask carrier web adhered to said premask adhesive layer; wherein, upon exposure of said graphic composite to an elevated temperature, said premask adhesive layer decreases substantially in adhesion compared to the adhesion of said bonding adhesive such that said premask carrier web and said premask adhesive layer can be easily removed from said protective coating.

2. The graphic composite of claim 1 further including a release liner removably adhered to said bonding adhesive layer.

3. The graphic composite of claim 1 wherein said premask adhesive layer comprises:
   (a) at least one melamine compound present in the range of 0.5 to 50 percent by weight.
   (b) a diaziridine compound present in the range of 1.0 to 30.0 percent by weight; and
   (c) a copolymer of an acrylic acid ester of a non-tertiary alcohol and at least one monoethylenic monomer copolymerizable therewith.

4. The graphic composite of claim 3 wherein said acrylic acid ester of a non-tertiary alcohol contains between 1 and 14 carbon atoms.

5. The graphic composite of claim 3 wherein said copolymerizable monoethylenic monomer is selected from the group consisting of acrylic acid, methacrylic acid and itaconic acid.

6. The graphic composite of claim 1 further including a backsize coating adhered to said premask carrier web.

* * * * *